(12) United States Patent
Castinado

(10) Patent No.: US 11,250,455 B2
(45) Date of Patent: Feb. 15, 2022

(54) ENTITY RESOURCE DEPLOYMENT AND CONVERSION SYSTEM

(71) Applicant: BANK OF AMERICA CORPORATION, Charlotte, NC (US)

(72) Inventor: Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 130 days.

(21) Appl. No.: 16/238,158

(22) Filed: Jan. 2, 2019

(65) Prior Publication Data
US 2020/0211046 A1   Jul. 2, 2020

(51) Int. Cl.
| | | |
|---|---|---|
| *G06Q 30/02* | (2012.01) | |
| *G06Q 20/30* | (2012.01) | |
| *G06Q 20/40* | (2012.01) | |
| *G06Q 20/18* | (2012.01) | |
| *G06Q 30/06* | (2012.01) | |

(52) U.S. Cl.
CPC ......... *G06Q 30/0222* (2013.01); *G06Q 20/18* (2013.01); *G06Q 20/30* (2013.01); *G06Q 20/401* (2013.01); *G06Q 30/0238* (2013.01); *G06Q 30/06* (2013.01)

(58) Field of Classification Search
CPC .......... G06Q 30/0222; G06Q 30/0238; G06Q 30/0268
See application file for complete search history.

(56) References Cited

U.S. PATENT DOCUMENTS

| | | | |
|---|---|---|---|
| 6,138,911 A * | 10/2000 | Fredregill | ............ G06Q 20/342 235/380 |
| 7,467,096 B2 | 12/2008 | Antonucci et al. | |
| 7,716,082 B1 * | 5/2010 | Blalock | ................ G06Q 20/327 705/17 |
| 8,051,008 B2 | 11/2011 | Postrel | |
| 8,180,671 B2 | 5/2012 | Cohagan et al. | |
| 8,469,801 B2 | 6/2013 | Ocko et al. | |
| 8,668,146 B1 | 3/2014 | McGhie et al. | |
| 8,684,265 B1 | 4/2014 | McGhie | |
| 8,712,840 B2 | 4/2014 | Postrel | |
| 8,725,564 B2 | 5/2014 | Postrel | |
| 9,251,528 B1 | 2/2016 | McGhie et al. | |
| 9,600,811 B2 * | 3/2017 | Fisher | ................ G06Q 20/4012 |
| 9,972,047 B1 | 5/2018 | Elliott et al. | |
| 9,990,642 B2 | 6/2018 | Strock et al. | |
| 10,007,915 B2 | 6/2018 | Singh et al. | |
| 10,713,665 B2 | 7/2020 | Fan | |

(Continued)

*Primary Examiner* — Azam A Ansari
(74) *Attorney, Agent, or Firm* — Moore & Van Allen PLLC; Nicholas C. Russell

(57) ABSTRACT

Embodiments of the invention are directed to a system, method, or computer program product for converting accumulated digitally stored auxiliary resources, via real-time transformation, into unrestricted resources for utilization in a technology activity. In this way, the invention identifies historic technology activities that qualify for auxiliary resources generation and stores those auxiliary resources relative to entities accepting the auxiliary resources. At the time of a technology activity, the invention identifies the entity associated with the activity and, in real-time converts and transmits available auxiliary resources to a user for use as unrestricted resources for the activity.

14 Claims, 4 Drawing Sheets

(56) References Cited

U.S. PATENT DOCUMENTS

| | | |
|---|---|---|
| 2008/0201224 A1 | 8/2008 | Owens et al. |
| 2008/0228580 A1 | 9/2008 | Korman et al. |
| 2009/0299846 A1 | 12/2009 | Brueggemann et al. |
| 2010/0257040 A1 | 10/2010 | Hunt |
| 2012/0123841 A1* | 5/2012 | Taveau ............... G06Q 20/32 705/14.23 |
| 2013/0124351 A1* | 5/2013 | Fisher ............. G06Q 30/0238 705/21 |
| 2013/0218684 A1* | 8/2013 | Roberts .............. G06Q 50/01 705/14.64 |
| 2014/0081736 A1 | 3/2014 | Blackhurst et al. |
| 2014/0244506 A1* | 8/2014 | Gramling ........... G06Q 20/401 705/44 |
| 2015/0046241 A1 | 2/2015 | Salmon et al. |
| 2015/0286995 A1 | 10/2015 | Korosec |
| 2016/0162882 A1* | 6/2016 | McClung, III ..... G06Q 20/3227 705/41 |
| 2018/0053189 A1* | 2/2018 | Monk ................. H04W 4/029 |

* cited by examiner

ENTITY RESOURCE DEPLOYMENT AND CONVERSION SYSTEM

BACKGROUND

In conventional auxiliary resource networks, the auxiliary resources are stored individually and not across entities. Furthermore, the auxiliary resources are retroactively applied post technology event as resources for the event. This limits user availability to resource distribution technology. As such, there exists a need for an interconnected resource distribution machine network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the invention provides an entity resource deployment and conversion system. In this way, the invention converts, in real-time, accumulated digitally stored auxiliary resources via real-time transformation, into unrestricted resources for utilization in a technology activity.

In some embodiments, the invention may further comprise a trade network for auxiliary resources. The network may have a marketplace where individuals may post one or more auxiliary resources they have and offer those resources for trade to other individuals. The system may manage the network and process the transition of the auxiliary resources from one individual to another.

Embodiments of the present invention address these and/or other needs by providing an innovative system, method and computer program product for auxiliary resource deployment and conversion, the invention comprising: identifying auxiliary resource sources associated with a user; monitoring auxiliary resource accumulation over time from the auxiliary resource source and store the auxiliary resource accumulation in a merchant specific database; identifying a user interacting with a merchant to perform a technology activity; triggering extraction of the auxiliary resources for the user applicable to the merchant; converting the auxiliary resource into merchant specific unrestricted resources; and applying, upon user authorization, the unrestricted resources in real-time to a current technology activity between the merchant and the user.

In some embodiments, the invention further comprises allowing user authorization and acceptance of application of the unrestricted resources via communication with a user device and/or a POT device.

In some embodiments, the invention further comprises applying additional auxiliary resources compiled from a current technology activity to the current technology activity for mitigating a total resource amount due from the user in the current technology activity.

In some embodiments, converting the auxiliary resource into merchant specific unrestricted resources comprises calculating an amount of unrestricted resources the auxiliary resource have accumulated based on merchant predetermined criteria.

In some embodiments, unrestricted resources comprise resources that are unrestricted and can be applied directly to a total amount of a transaction in real-time.

In some embodiments, auxiliary resources are applied to a future technology activity with specific merchant.

In some embodiments, the technology activity comprises one or more activities between a merchant and the user for a product or service exchange.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
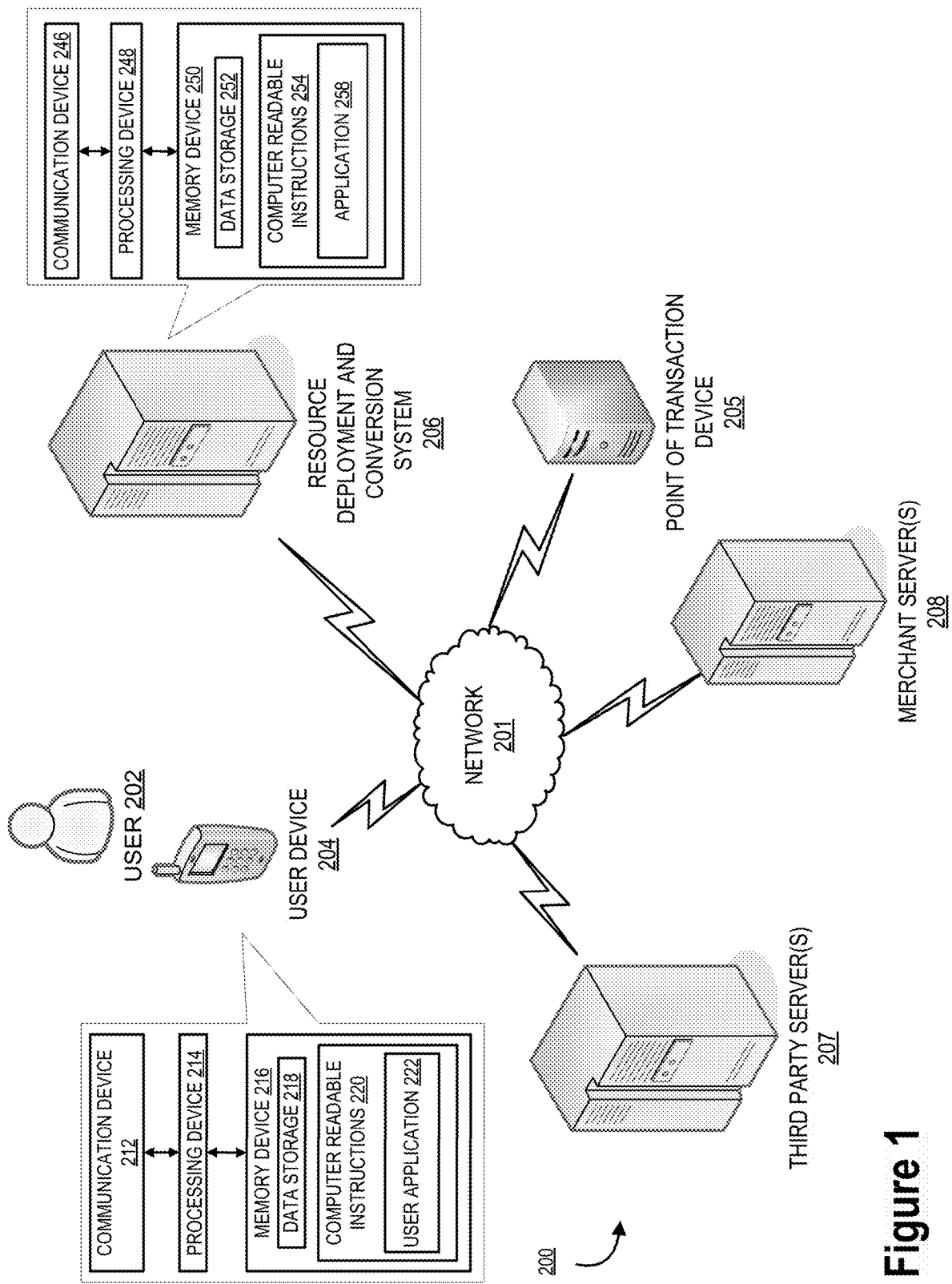
Figure 2:
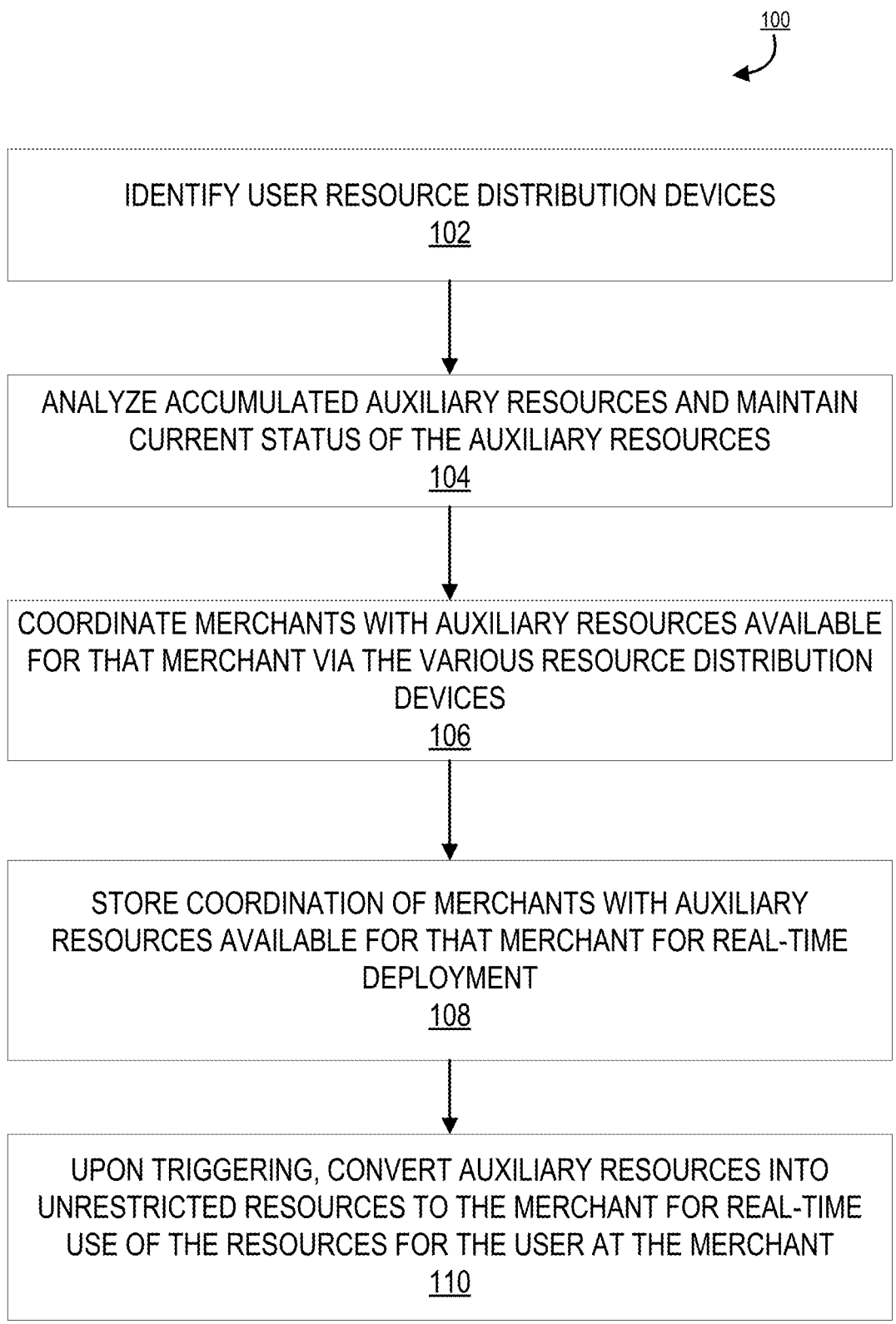
Figure 3:
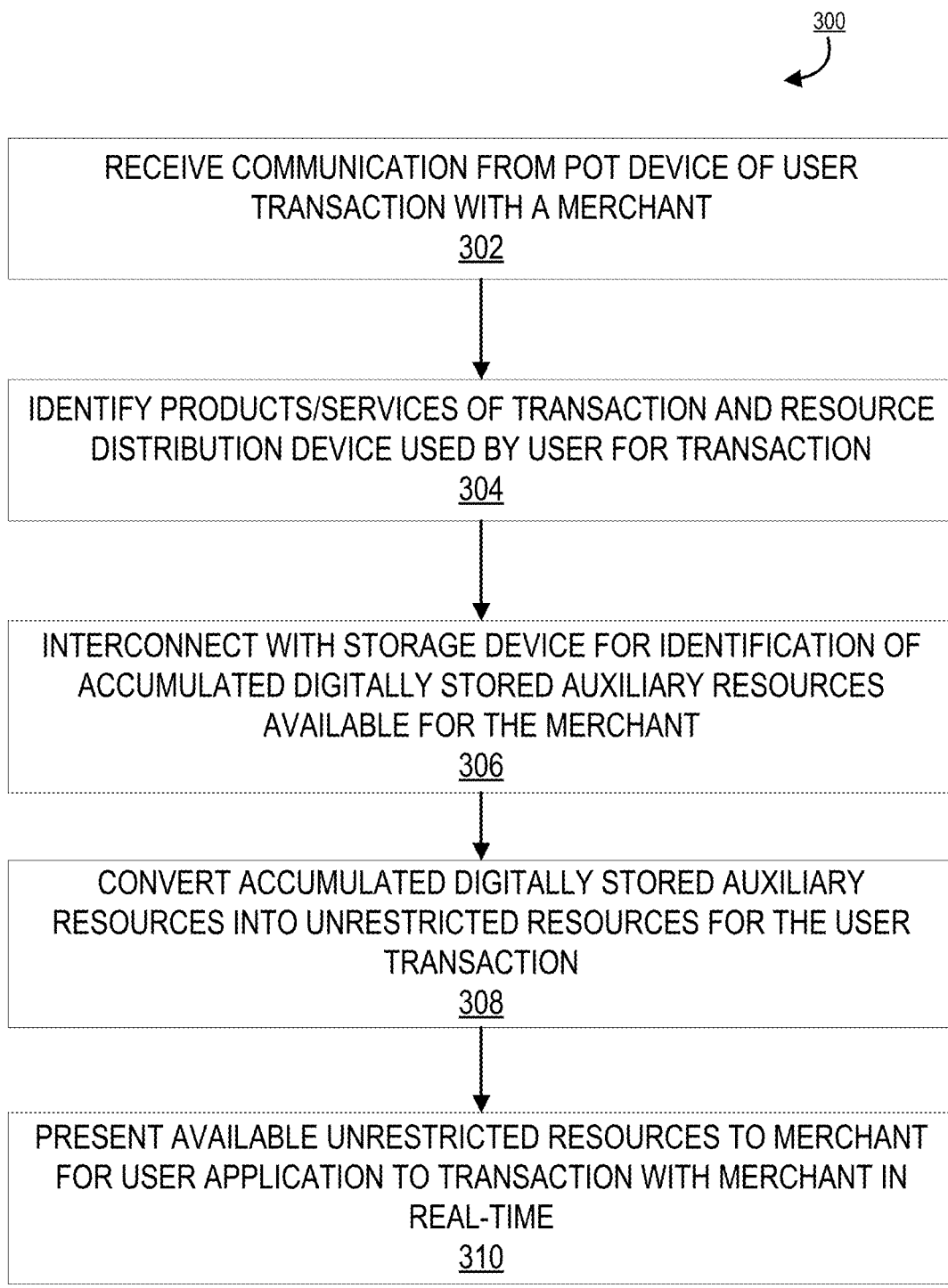
Figure 4:
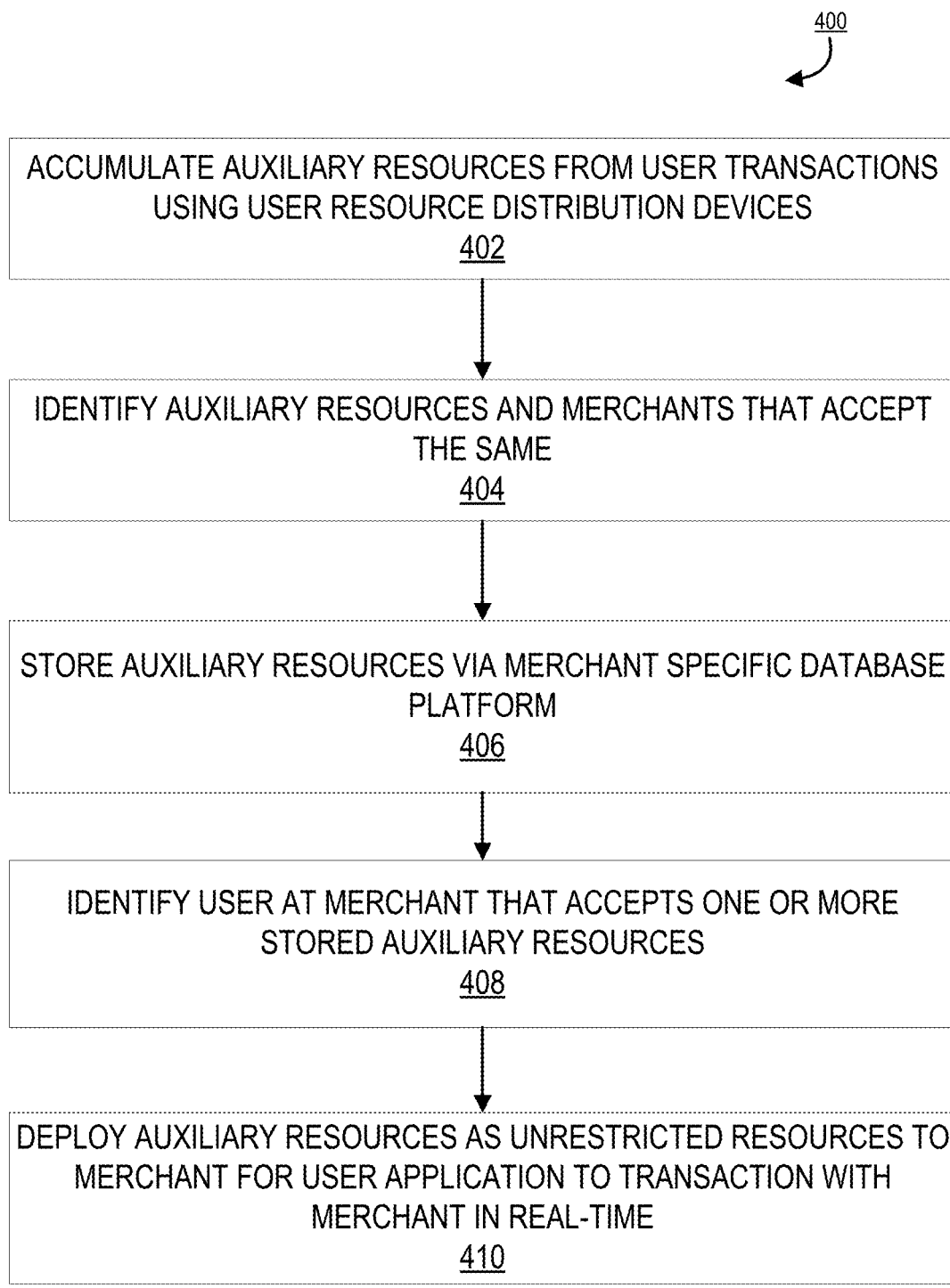

Having thus described embodiments of the invention in general terms, reference will now be made to the accompanying drawings, wherein:

FIG. 1 provides an entity resource deployment and conversion system environment, in accordance with one embodiment of the present invention;

FIG. 2 provides an entity resource deployment and conversion setup process, in accordance with one embodiment of the present invention;

FIG. 3 provides a process for implementation of the entity resource deployment and conversion in real-time, in accordance with one embodiment of the present invention; and FIG. 4 provides a process flow illustrating collection of auxiliary resources for the entity resource deployment and conversion, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. The user may interact with an entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "technology activity" may include a transaction for a product or service from a merchant. A "transaction" or "resource distribution" refers to any communication between a user and an entity to transfer funds for the purchasing or selling of a product or service. A transaction may refer to a purchase of goods or services, a return of goods or services, a payment transaction, a credit transaction, or other interaction involving a user's account. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In various embodiments, the point-of-transaction device (POT) may be or include a merchant machine and/or server and/or may be or include the mobile device of the user may function as a point of transaction device. The embodiments described herein may refer to the use of a transaction, transaction event or point of transaction event to trigger the steps, functions, routines or the like described herein. In various embodiments, occurrence of a transaction triggers the sending of information such as alerts and the like. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to a technology activity such as an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

In some embodiments, information associated with the purchase transaction is received from a POT including a point-of-sale (POS) terminal during a transaction involving a consumer and a merchant. For example, a consumer checking out at a retail merchant, such as a grocer, may provide to the grocer the one or more goods or products that the user is purchasing together with a payment method, loyalty card, and possibly personal information, such as the name of the consumer. This information along with information about the merchant may be aggregated or collected at the POS terminal and routed to the system or server of the present invention or otherwise a third party affiliate of an entity managing the system of this invention. In other embodiments when the purchase transaction occurs over the Internet, the information associated with the purchase transaction is collected at a server providing an interface for conducting the Internet transaction. In such an embodiment, the consumer enters product, payment, and possibly personal information, such as a shipping address, into the online interface, which is then collected by the server. The server may then aggregate the transaction information together with merchant information and route the transaction and merchant information to the system of the present invention. It will be further be understood that the information associated with the purchase transaction may be received from any channel such as an ATM, Internet, peer-to-peer network, POS, and/or the like.

Accumulated digitally stored auxiliary resources may include any accumulated rewards, points, or the like including cash back rewards, loyalty points, reward miles, and the like that may be applied to one or more transactions with a merchant.

In some embodiments, the invention may further comprise a trade network for auxiliary resources. The network may have a marketplace where individuals may post one or more auxiliary resources they have and offer those resources for trade to other individuals. The system may manage the network and process the transition of the auxiliary resources from one individual to another.

FIG. 1 provides an entity resource deployment and conversion system environment 200, in accordance with one embodiment of the present invention. FIG. 1 provides the system environment 200 for which the distributive network system with specialized data feeds associated with an interconnected resource distribution and retention network. FIG. 1 provides a unique system that includes specialized servers and system communicably linked across a distributive network of nodes required to perform the functions described herein. In some embodiments, the invention converts, in real-time, accumulated digitally stored auxiliary resources via real-time transformation, into unrestricted resources for utilization in a technology activity.

As illustrated in FIG. 1, the merchant server 208 is operatively coupled, via a network 201 to the user device 204, point-of-transaction device 205, third party servers 207, and to the resource distribution and retention system 206. In this way, the merchant server 208 can send information to and receive information from the user device 204, point-of-transaction device 205, third party servers 207, and the resource distribution and retention system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204 and is a customer of a financial institution exchanging or distributing resources that is associated with the network. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the resource distribution and retention system 206, the merchant server 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the resource distribution and retention system 206.

As further illustrated in FIG. 1, the resource distribution and retention system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant server 208, the third party server 207, the point-of-transaction device 205, and the user device 204. As such, the communication device 246 generally comprises a modem, server, or other device for communicating with other devices on the network 201.

As further illustrated in FIG. 1, the resource distribution and retention system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the resource distribution and retention system 206 the memory device 250 stores an application 258. In one embodiment of the invention, the application 258 may associate with applications having computer-executable program code. Furthermore, the resource distribution and retention system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant server 208, third party servers 207, point-of-transaction device 205, and/or user device 204.

As illustrated in FIG. 1, the third party server 207 is connected to the merchant server 208, user device 204, point-of-transaction device 205, and resource distribution and retention system 206. The third party server 207 has the same or similar components as described above with respect to the user device 204 and the resource distribution and retention system 206. While only one third party server 207 is illustrated in FIG. 1, it is understood that multiple third party servers 207 may make up the system environment 200. The third party server 207 may be associated with one or more financial institutions, entities, or the like.

As illustrated in FIG. 1, the point-of-transaction (POT) device 205 is connected to the merchant server 208, user device 204, third party server 207, and resource distribution and retention system 206. The point-of-transaction device 205 has the same or similar components as described above with respect to the user device 204 and the resource distribution and retention system 206. While only one point-of-transaction device 205 is illustrated in FIG. 1, it is understood that multiple point-of-transaction device 205 may make up the system environment 200. In some embodiments, the POT device is or includes an interactive computer terminal that is configured to initiate, perform, complete, and/or facilitate one or more transactions. A POT device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), and/or various combinations of the foregoing.

In some embodiments, a POT device is operated in a public place (e.g., on a street corner, at the doorstep of a private residence, in an open market, at a public rest stop, and the like). In other embodiments, the POT device, is additionally or alternatively operated in a place of business (e.g., in a retail store, post office, banking center, grocery store, factory floor, and the like). In accordance with some embodiments, the POT device is not owned by the user of the POT device. Rather, in some embodiments, the POT device is owned by an entity operator or a POT operator (e.g., merchant, vendor, salesperson, or the like). In yet other embodiments, the POT device is owned by the financial institution offering the POT device providing functionality in accordance with embodiments of the invention described herein.

As illustrated in FIG. 1, the POT device may generally comprises a reading device, a communication device, a processing device, and a memory device. The reading device is operatively coupled to the processing device, communication device, and the memory device. The POT device may include a reader device to receive payment account information from the user through the user device, mobile application server, financial institution systems, and/or other potential user payment devices. Such a reader device may include, but is not limited to a magnetic strip reader, a barcode scanner, a radio frequency (RF) reader, a character recognition device, a magnetic ink reader, an NFC reading device, a processor for interpreting codes presented over an electrical or optical medium, a biometric reader, a wireless receiving device, and/or the like. In some embodiments, the reading device receives information that may be used to identify the user's payment account from a payment device and may communicate via the communication device over a network, to other systems such as, but not limited to, the mobile application server, financial institution systems, and/or the user device. As such, the communication device generally comprises a modem, server, or other device for communicating with other devices on the network 201.

As further illustrated in FIG. 1, the POT device 205 comprises computer-readable instructions stored in the memory device, which in one embodiment includes the computer-readable instructions of a merchant application. A POT device 205 may refer to any device that may be configured to carry out a transaction.

In some embodiments, a POT device 205 is or includes an interactive computer terminal that is configured to initiate, perform, complete, and/or facilitate one or more transactions. A POT device 205 could be or include any means that a user may use to perform a transaction with an merchant, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), and/or various combinations of the foregoing.

In some embodiments, a POT device 205 is operated in a public place (e.g., on a street corner, at the doorstep of a private residence, in an open market, at a public rest stop, or the like). In other embodiments, the POT device 205 is additionally or alternatively operated in a place of business (e.g., in a retail store, post office, banking center, grocery store, factory floor, or the like). In accordance with some embodiments, the POT device 205 is not owned by the user of the POT device 205. Rather, in some embodiments, the POT device 205 is owned by a mobile business operator or a POS operator (e.g., merchant, vendor, salesperson, and the like). In yet other embodiments, the POT device 205 is owned by a financial institution offering the POT device 205 providing functionality in accordance with embodiments of the invention described herein.

The POT device 205 as discussed herein may include any point-of-transaction device, such as a cash register, ATM, smart phone, back end server of a merchant, or the like. As such, the POT device 205 may be able perform a sale, an account balance check, a reward transfer, and account money transfer, a user opening up a bank application on the user's mobile device or computer, a user 202 using his/her e-wallet, and/or the like.

In the embodiment illustrated in FIG. 1, a merchant application allows the POT device 205 to be linked to the mobile application server and other devices on the network to communicate, via a network 201, the information related to the transaction being made, such as the transaction type, cost of transaction, product type, merchant location, and the like. In this way, the merchant module may provide confirmation authorization of a potential communication between the user device and the POT device 205 communicate a transaction with the user device either directly or indirectly, receive commands from a user, receive a payment device for payment for a transaction, and provide storable transaction information. In one example, the user enters into a transaction at a POT device 205 of a merchant, which processes the transaction. The merchant module may communicate the transaction, such as the products the user is purchasing to the user. In some embodiments, the merchant module may communicate the transaction to the mobile application server, which may, in turn provide the transaction communication to the user device. In other embodiments, the merchant module may communicate the transaction to the user device. In this way, the user device may display the products of the transaction, the price, and other aspects of the transaction either visually and/or audibly for the user to review.

In some embodiment, the merchant module may provide confirmation of authorization of a potential communication between the user device and the device 205. In this way, the user via the user device may interact with the POT device 205 to ensure that the user is wishing to enter into a transaction at the merchant's POT device 205. This interaction provides security functions, as well as initiating a transaction communication between the user system and the devices on the system 200.

The merchant module associated with the POT device 205 and/or the merchant servers 208 may receive an authorization request from a user device. The authorization request may include providing a PIN number input, touch connection, and/or unique code identification. In some embodiments, the authorization request may be a touch connection that may include a mat located at the POT device 205 such that the user may place the user device on the mat to authorize that the user is wishing to transact with the merchant. In some embodiments, the authorization request may provide a unique code identification such as a NFC token, voice, text, and/or the like to authorize the communication. The authorization request may be a unique code identification presented by the user device to communicate that with the POT device 205. Unique code identifications may include, in some embodiments, various universal product codes (UPC codes), numbers associated with a UPC code, QR codes, and/or the like. In some embodiments, the UPC code may comprise a 12 digit code and include between a 6 to 10 digit company prefix. The authorization request may comprise UPC codes such as those assigned by the GS1 US (formerly the Uniform Code Council) and/or the like.

The unique code identification presented by the user device may be identified by the merchant module in several ways, including but not limited to the code identification being read by the reader device of the POT device 205, the code identification being scanned by the reading device of the POT device 205, the code identification being keyed into the POT device 205 and/or other ways to transmit the authorization request to the merchant module. For example, if the unique code identification is a UPC code, the code may be displayed on the user device. The user may provide the user device to the merchant. The merchant may then scan the UPC code on the user device using the POT device 205.

In some embodiments, the communication link may enable the merchant module, through the communication device to communicate directly with the user device. In other embodiments, the communication link may enable the merchant module, through the communication device 236 to communicate indirectly between the POT device 205 and the user device by communicating with the mobile application server. This communication link allows the merchant module to communicate for the terms of the transaction and/or the transaction itself to the user either directly or indirectly. The merchant module communication of the transaction to the user may include audio and/or visual indications as to the transaction, such that the user may monitor the transaction. For example, if the user is purchasing several items at a grocery store POT, each time a product is scanned at the POT device 205, the merchant module may communicate either directly or indirectly with the user device to allow the user device to either audibly and/or visually provide the user with an indication as to the type and price of each product that is scanned at the POT device 205 during the transaction.

As illustrated in FIG. 1, the merchant server 208 is connected to the third party server 207, user device 204, point-of-transaction device 205, and resource distribution and retention system 206. The merchant server 208 may be associated with the resource distribution and retention system 206. The merchant server 208 has the same or similar components as described above with respect to the user device 204 and the resource distribution and retention system 206. While only one merchant server 208 is illustrated in FIG. 1, it is understood that multiple merchant server 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The merchant server 208 may generally include a processing device communicably coupled to devices as a memory device, output devices, input devices, a network interface, a power source, one or more chips, and the like. The merchant server 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the merchant server 208 described herein.

In some embodiments, the invention converts, in real-time, accumulated digitally stored auxiliary resources via real-time transformation, into unrestricted resources for utilization in a technology activity.

FIG. 2 provides an entity resource deployment and conversion setup process 100, in accordance with one embodiment of the present invention. As illustrated in block 102, the process 100 is initiated by identifying user resource distribution devices. These user resource distribution devices include payment vehicles of the user. These payment vehicles may collect auxiliary resources when the user uses the payment vehicle for completion of a transaction for a product or service. However, these auxiliary resources may not be able to be used at the time of the transaction, but instead may be applied to later transactions, such as miles, points, cash back, rewards, loyalty rewards, or the like. In this way, the system may identify the payment vehicles of the users. The user may provide the payment vehicle information to the system. In other embodiments, the system may identify various user payment vehicles via communication with one or more financial institution servers.

As illustrated in block 104, the process 100 continues by analyzing the accumulated auxiliary resources and maintaining a current status of the auxiliary resources. Over time, users may collect and accumulate auxiliary resources from merchants, payment vehicles, financial institutions, third parties, or the like. The system may identify the various locations of the auxiliary resources and maintain a current status of the auxiliary resources. The current status may include the merchants that the auxiliary resources may be used at, the amount of unrestricted resources the auxiliary resources translate into, expiration of the auxiliary resources, or the like.

As illustrated in block 106, the process 100 continues by coordinating merchants with auxiliary resources available for that merchant via the various resource distribution devices. In this way, some auxiliary resources may apply to different merchants and not others. As such, the system identifies which auxiliary resources apply to different merchants and coordinates to confirm the auxiliary resources available from the user to use for transactions with the merchant. Next, as illustrated in block 108, the process 100 continues to store coordination of merchants with the auxiliary resources available for that merchant for real-time deployment. In this way, the system stores the auxiliary resources in real-time for deployment of the auxiliary resources for user transactions at the merchant. As such, the system may identify the auxiliary resources and the merchants that may accept those auxiliary resources and store those data points within a database platform for real-time triggering and deployment of the auxiliary resources for a transaction at the merchant.

As such, as illustrated in block 110, the process 100 continues by converting the auxiliary resources into unrestricted resources to use at the merchant for real-time user of the resources for the user at the merchant. As such, upon a user transaction with a merchant, the system may identify the auxiliary resources available for that merchant, and in real-time allow for the transformation of those auxiliary resources into unrestricted resources for use during the transaction.

FIG. 3 provides a process for implementation of the entity resource deployment and conversion in real-time 300, in accordance with one embodiment of the present invention. As illustrated in block 302, the process 300 is initiated by receiving communication from a point-of-transaction (POT) device of the user transaction with a merchant. As such, the user may be transacting with a merchant for a product or service. The system may recognize the user transacting with the merchant and be provided a signal from the POT device associated with the merchant that a transaction has been initiated.

As illustrated in block 304, the process 300 continues by identifying products/services of the transaction and resource distribution device used by the user for the transaction. In this way, the system may receive information from the POT device, user device, or the like indicating that a transaction is occurring at a merchant location for products/services using a specific payment device.

As illustrated in block 306, the process 300 continues by interconnecting with a storage device for identification of the accumulated digitally stored auxiliary resources that are available for that merchant, and more specifically for that product/service. In some embodiments, auxiliary resources may be applicable at the merchant for any product/service. In some embodiments, auxiliary resources may be applicable at the merchant for specific products/services. The system may determine which accumulated auxiliary resources are available to the user for that particular transaction, include the merchant and/or the products/services of the transaction.

In some embodiments, the invention may further comprise a trade network for auxiliary resources. The network may have a marketplace where individuals may post one or more auxiliary resources they have and offer those resources for trade to other individuals. The system may manage the network and process the transition of the auxiliary resources from one individual to another.

Next, the system may convert the accumulated digitally stored auxiliary resources that are available to the user for the particular transaction into unrestricted resources for the transaction, as illustrated in block 308. The conversion may be a direct one to one conversion or a not direct one to one conversion from auxiliary resources to unrestricted resources, such in the way of points, miles, rewards, or the like. The conversion may result in unrestricted resources that may be applied to a transaction the user is currently performing at the merchant.

Finally, as illustrated in block 310, the process 300 is finalized by presenting the available unrestricted resources to the merchant for user application to the current transaction with the merchant in real-time.

FIG. 4 provides a process flow illustrating collection of auxiliary resources for the entity resource deployment and conversion 400, in accordance with one embodiment of the present invention. As illustrated in block 402, the process 400 is initiated by accumulating auxiliary resources from user past transactions using user resource distribution devices. In this way, during transaction with a merchant in the past, the user may earn rewards in the form of auxiliary resources that may be stored for use in subsequent transactions. The system may identify those auxiliary resources from the user resource distribution devices, loyalty rewards, or the like and coordinate with the merchants that accept each of the various auxiliary resources, as illustrated in block 404.

Next, as illustrated in block 406, the process 400 continues by storing the auxiliary resources in a database in a merchant specific manner, such that the system may identify the auxiliary resources available for use during a transaction at a particular merchant. As illustrated in block 408, the process 400 continues by identifying a user at a merchant that accepts one or more stored auxiliary resources. Upon identification that the merchant accepts those auxiliary resources, the system may deploy the auxiliary resources as unrestricted resources to the merchant fur user application to the transaction with the merchant in real-time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for auxiliary resource deployment and conversion, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
   identify auxiliary resource sources associated with a user;
   monitor and compile auxiliary resource accumulation over time and for a current technology activity from the auxiliary resource source and store the auxiliary resource accumulation in a merchant specific database;
   identify a user interacting with a merchant to perform a technology activity, where the identification of the user interacting with the merchant is a communication from a point of transaction device associated with the merchant;
   interconnect the point of transaction device with a storage device for coordination of the auxiliary resource by identifying the auxiliary resources accepted by the merchant;
   transmit a prompt to a user device, wherein the prompt includes a request to place the user device on an area of the point of transaction device to authorize that the user is wishing to transact with the merchant;
   in response to the user device being placed on the area of the point of transaction device, allow user authorization and acceptance of application of the unrestricted resources in real-time via communication with a user device and the point of transaction device;
   identify products of the technology activity based on the communication with the point of transaction device associated with the merchant;
   trigger extraction of the auxiliary resources for the user applicable to the merchant and applicable to the products of the technology activity;
   convert the auxiliary resource into merchant specific unrestricted resources;
   present via point of transaction device associated with the merchant the merchant specific unrestricted resources available to the user in real-time to apply to the technology activity;
   apply, upon user authorization, the unrestricted resources in real-time to the technology activity between the merchant and the user, wherein applying the unrestricted resources in real-time further comprises applying additional auxiliary resources compiled from the current technology activity to the current technology activity for mitigating a total resource amount due from the user in the current technology activity; and
   provide, upon user authorization, a trade network for auxiliary resources and post auxiliary resource not used by the user to the trade network for exchange with one or more other users and process a transition of the exchange.

2. The system of claim 1, wherein converting the auxiliary resource into merchant specific unrestricted resources comprises calculating an amount of unrestricted resources the auxiliary resource have accumulated based on merchant predetermined criteria.

3. The system of claim 1, wherein unrestricted resources comprise resources that are unrestricted and can be applied directly to a total amount of a transaction in real-time.

4. The system of claim 1, wherein auxiliary resources are applied to a future technology activity with specific merchant.

5. The system of claim 1, wherein the technology activity comprises one or more activities between a merchant and the user for a product or service exchange.

6. A computer program product for auxiliary resource deployment and conversion, the computer program product comprising at least one non-transitory computer-readable medium having computer-readable program code portions embodied therein, the computer-readable program code portions comprising:
   an executable portion configured for identifying auxiliary resource sources associated with a user;
   an executable portion configured for monitoring and compiling auxiliary resource accumulation over time and for a current technology activity from the auxiliary resource source and storing the auxiliary resource accumulation in a merchant specific database;
   an executable portion configured for identifying a user interacting with a merchant to perform a technology activity, where the identification of the user interacting with the merchant is a communication from a point of transaction device associated with the merchant;
   an executable portion configured for interconnecting the point of transaction device with a storage device for coordination of the auxiliary resource by identifying the auxiliary resources accepted by the merchant;
   an executable portion configured for transmitting a prompt to a user device, wherein the prompt includes a request to place the user device on an area of the point of transaction device to authorize that the user is wishing to transact with the merchant;
   an executable portion configured for, in response to the user device being placed on the area of the point of transaction device, allowing user authorization and acceptance of application of the unrestricted resources in real-time via communication with a user device and the point of transaction device;
   an executable portion configured for identifying products of the technology activity based on the communication with the point of transaction device associated with the merchant;
   an executable portion configured for triggering extraction of the auxiliary resources for the user applicable to the merchant and applicable to the products of the technology activity;
   an executable portion configured for converting the auxiliary resource into merchant specific unrestricted resources;
   an executable portion configured for presenting via point of transaction device associated with the merchant the merchant specific unrestricted resources available to the user in real-time to apply to the technology activity;

an executable portion configured for applying, upon user authorization, the unrestricted resources in real-time to the technology activity between the merchant and the user, wherein applying the unrestricted resources in real-time further comprises applying additional auxiliary resources compiled from the current technology activity to the current technology activity for mitigating a total resource amount due from the user in the current technology activity; and an executable portion configured for providing, upon user authorization, a trade network for auxiliary resources and post auxiliary resource not used by the user to the trade network for exchange with one or more other users and process a transition of the exchange.

7. The computer program product of claim 6, wherein converting the auxiliary resource into merchant specific unrestricted resources comprises calculating an amount of unrestricted resources the auxiliary resource have accumulated based on merchant predetermined criteria.

8. The computer program product of claim 6, wherein unrestricted resources comprise resources that are unrestricted and can be applied directly to a total amount of a transaction in real-time.

9. The computer program product of claim 6, wherein auxiliary resources are applied to a future technology activity with specific merchant.

10. The computer program product of claim 6, wherein the technology activity comprises one or more activities between a merchant and the user for a product or service exchange.

11. A computer-implemented method for auxiliary resource deployment and conversion, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying auxiliary resource sources associated with a user;

monitoring and compiling auxiliary resource accumulation over time and for a current technology activity from the auxiliary resource source and store the auxiliary resource accumulation in a merchant specific database;

identifying a user interacting with a merchant to perform a technology activity, where the identification of the user interacting with the merchant is a communication from a point of transaction device associated with the merchant;

interconnecting the point of transaction device with a storage device for coordination of the auxiliary resource by identifying the auxiliary resources accepted by the merchant;

transmitting a prompt to a user device, wherein the prompt includes a request to place the user device on an area of the point of transaction device to authorize that the user is wishing to transact with the merchant;

in response to the user device being placed on the area of the point of transaction device, allowing user authorization and acceptance of application of the unrestricted resources in real-time via communication with a user device and the point of transaction device;

identifying products of the technology activity based on the communication with the point of transaction device associated with the merchant;

triggering extraction of the auxiliary resources for the user applicable to the merchant and applicable to the products of the technology activity;

converting the auxiliary resource into merchant specific unrestricted resources;

presenting via point of transaction device associated with the merchant the merchant specific unrestricted resources available to the user in real-time to apply to the technology activity;

applying, upon user authorization, the unrestricted resources in real-time to the technology activity between the merchant and the user, wherein applying the unrestricted resources in real-time further comprises applying additional auxiliary resources compiled from the current technology activity to the current technology activity for mitigating a total resource amount due from the user in the current technology activity; and providing, upon user authorization, a trade network for auxiliary resources and post auxiliary resource not used by the user to the trade network for exchange with one or more other users and process a transition of the exchange.

12. The computer-implemented method of claim 11, wherein converting the auxiliary resource into merchant specific unrestricted resources comprises calculating an amount of unrestricted resources the auxiliary resource have accumulated based on merchant predetermined criteria.

13. The computer-implemented method of claim 11, wherein auxiliary resources are applied to a future technology activity with specific merchant.

14. The computer-implemented method of claim 11, wherein the technology activity comprises one or more activities between a merchant and the user for a product or service exchange.

* * * * *